(12) United States Patent
Greene et al.

(10) Patent No.: US 6,879,835 B2
(45) Date of Patent: Apr. 12, 2005

(54) LOCATION-SPECIFIC MESSAGING SYSTEM

(75) Inventors: David P. Greene, Ossining, NY (US); Edith H. Stern, Yorktown Heights, NY (US); Philip Shi-lung Yu, Chappaqua, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/008,075

(22) Filed: Dec. 4, 2001

(65) Prior Publication Data

US 2003/0104820 A1 Jun. 5, 2003

(51) Int. Cl.⁷ .............................. H04Q 7/00; H04B 7/00
(52) U.S. Cl. ............................... 455/456.1; 455/422.1; 455/466; 455/406; 701/200; 701/201
(58) Field of Search .......................... 455/456.1, 412.1, 455/414.1, 414.3, 422.1, 445, 456.3–457, 466, 41.2, 41.3, 517, 556.2, 406; 701/200, 207; 409/203, 205

(56) References Cited

U.S. PATENT DOCUMENTS 6,519,525 B2 * 2/2003 Namba ....................... 701/200

| | | | |
|---|---|---|---|
| 2001/0021654 A1 * | 9/2001 | Spratt et al. ................. | 455/456 |
| 2002/0019238 A1 * | 2/2002 | McDonnell et al. ......... | 455/456 |
| 2002/0147766 A1 * | 10/2002 | Vanska et al. .............. | 709/203 |
| 2002/0164977 A1 * | 11/2002 | Link, II et al. ............. | 455/414 |
| 2003/0083045 A1 * | 5/2003 | Blight et al. ................. | 455/412 |
| 2003/0083076 A1 * | 5/2003 | Pradhan et al. ............. | 455/456 |
| 2004/0102196 A1 * | 5/2004 | Weckstrom et al. ....... | 455/456.1 |

OTHER PUBLICATIONS

Mynatt et al. "Audio Aura: Light–Weight Audio Augmented Reality", (Copyright 1997)—pp. 211–212.

Bederson, Benjamin B., "Audio Augmented Reality: A Prototype Automated Tour Guide", http://www.cs.um-d.edu/~ bederson/papers/chi–95–aar/, download Aug. 1, 2001—4 pages.

* cited by examiner

Primary Examiner—David Hudspeth
Assistant Examiner—Kamran Afshar
(74) Attorney, Agent, or Firm—Buckley, Maschoff & Talwalkar LLC; Stephen C. Kaufman

(57) ABSTRACT

A method of transferring data includes reception of a message from a first mobile device operated by a user, storage of the message according to a location of the first mobile device, reception of an indication that a second mobile device operated by a second user is located proximate to the location, and transmission of the message to the second mobile device.

43 Claims, 7 Drawing Sheets

292

| LOCATION ID 501 | DESCRIPTION 502 | LOCATION 503 |
|---|---|---|
| L02 | SHOPPING MALL | 123 MAIN STREET ANYWHERE, U.S.A. |
| L11 | ENTERTAINMENT VENUE | 41:07:56N 73:42:46W |
| L94 | PAINTING 03964 | UNKNOWN |
| L1013 | ADVERTISEMENT AXBC3 | 40:47:00N 73:58:00W |
| L9987 | VENDING MACHINE PA4932 | UNKNOWN |

| MESSAGE ID 601 | LOCATION ID 602 | MESSAGE DETAILS 603 | MESSAGE FILE 604 |
|---|---|---|---|
| M01 | L9987 | 8/14/01; 10:03; VIDEO; RECEIVING FEE = $5 | VX93.MPG |
| M02 | L94 | 8/15/01; RECEIVING AGE > 17 | P349.JPG |
| M03 | L02 | "DO YOU PREFER BRAND X OR BRAND Y?" | NONE |
| M04 | L11 | 8/17/01; 22:36; AGE = 19; RATING = 3 | CONCERT1.TXT |
| M05 | L11 | 8/17/01; 22:39; AGE = 23 | CONCERT2.TXT |

FIG. 6

LOCATION-SPECIFIC MESSAGING SYSTEM

BACKGROUND OF THE INVENTION

1. Field of the Invention

The present invention relates to messaging systems. More specifically, the present invention concerns messaging systems in which messages are transmitted by and to mobile devices.

2. Description of the Related Art

Mobile communication devices are becoming ubiquitous. Examples of such devices include cellular telephones, pagers, personal digital assistants (PDAs), and laptop computers. These devices may be used to transmit data, to receive data, and to present data to a user. The data, in turn, may represent voice, text, graphics, or the like. Accordingly, mobile communication devices provide users with significant functionality.

One drawback of current mobile communication devices results from the typical manner in which these devices communicate with other devices. In order to transmit a message to a receiving device, these devices require a code associated with the receiving device. For example, a cellular telephone cannot transmit a telephone call to a receiving telephone without using a telephone number associated with the receiving telephone. As a result, it is difficult to transmit data to or receive data from devices for which such codes are not known.

Further, at times it may be desirable to transmit a message to a device which is not known to the sender, but which fits a set of criteria. For example, a traveler may wish to send a message to other travelers in the vicinity warning that pigeons regularly whitewash a specific park bench. In this case, the message is to be delivered asynchronously, and to at least one device not previously known.

What is therefore needed is a system capable of transferring data from one mobile device to another in which the mobile devices need not possess device-specific information to the extent required by conventional systems.

SUMMARY OF THE INVENTION

In order to address the foregoing, the present invention provides a method, an apparatus, a system, a medium, and means to transfer data in which a message is received from a first mobile device operated by a user, the message is stored according to a location of the first mobile device, an indication is received that a second mobile device operated by a second user is located proximate to the location, and the message is transmitted to the second mobile device. By virtue of these features, the present invention provides efficient communication between two mobile devices. Notably, the user's mobile device does not require any information identifying the second user such as a telephone number, an Internet Protocol (IP) address or an e-mail address. In addition, the second device is not required to be in direct communication with the first mobile device. Moreover, the message may provide useful information or questions regarding the location or regarding a physical entity proximate to the location.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 5 is a representative view of a tabular portion of a location database according to embodiments of the present invention.

FIG. 6 is a representative view of a tabular portion of a message information database according to embodiments of the present invention.

DETAILED DESCRIPTION

Figure 1:
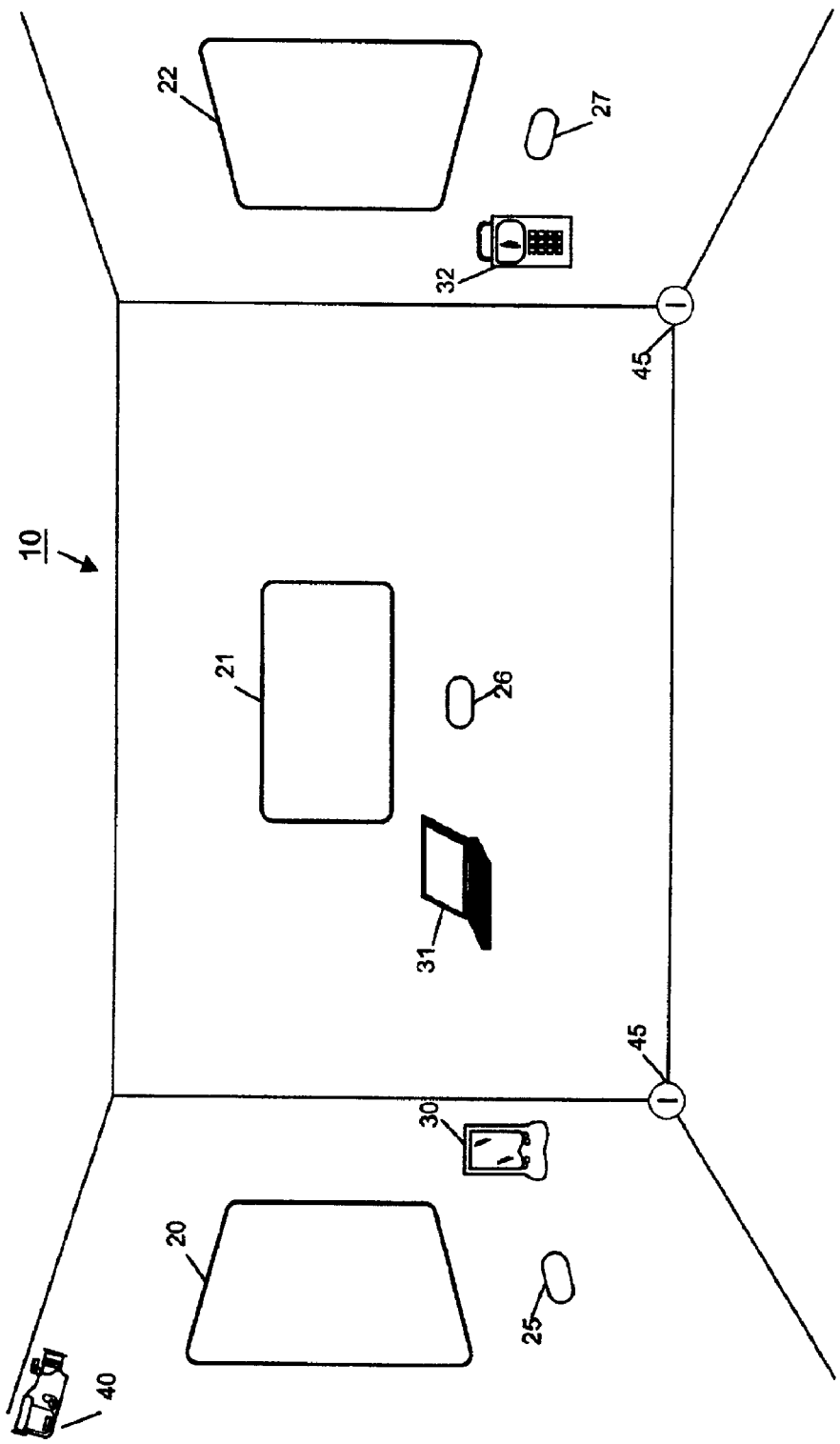
FIG. 1 is a representative view of an exhibit hall including an embodiment of the present invention.

FIG. 1 is a view of an arrangement according to some embodiments of the invention. The view is intended to provide a brief introduction to some of the features of the invention. Specific implementation details are set forth below, along with descriptions of other embodiments of the claimed invention.

Exhibit hall 10 is a room in which exhibits are displayed. Accordingly, mounted on the depicted walls of exhibit hall 10 are exhibits 20 through 22, which may include paintings, photographs, documents, video displays, computer-generated images or any other material that may be perceived by a visitor to hall 10. Associated with each of exhibits 20 through 22 is one of interface devices 25 through 27. Interface devices 25 through 27 provide a network interface to user devices such as mobile devices 30 through 32, respectively comprising a PDA, a laptop computer, and a cellular telephone.

In one example of operation, a user operating mobile device 30 establishes communication with interface device 25 by inputting a command to join a Bluetooth® network including interface device 25. As described below, communication between mobile device 30 and interface device 25 may be established using many other networking and communication techniques. Once communication is established, mobile device 30 transmits a message to interface device 25. The message is stored on a network storage device (not shown) in association with information, such as an identifier, representing the location of exhibit 20. In some embodiments, the network storage device is dedicated to exhibit 20. Accordingly, no identifier need be stored because all messages stored in the network storage device are assumed to be associated with exhibit 20. In some embodiments, the message is stored in a data field, database, and/or storage medium associated with the location of mobile device 30. Again, no identifier need be stored in conjunction with these latter embodiments.

Next, a second user operates mobile device 31 to establish communication with interface device 25 and to request messages concerning exhibit 20. The stored message is retrieved from the network storage device by virtue of its association with the identifier, and is transmitted to mobile device 31 by interface device 25. Mobile device 31 thereafter presents the message to the second user. The present invention may thereby provide an efficient system for communication between mobile devices in which the mobile devices need not have knowledge of one another. With respect to the specific embodiment of FIG. 1, the present invention provides a system for submitting and retrieving publicly-accessible commentary or information regarding a physical entity or a location.

Many variations of the FIG. 1 embodiment fall within the scope of the present invention. For example, interface device 25 may simply provide information usable by mobile device 30 to communicate with the data storage device, rather than a communications link. Such information may include a telephone access number, a Web address, an exhibit code, or other appropriate information. In addition, communication between mobile device 30 and the data storage device may be automatically established once mobile device 30 is detected in hall 10, proximate to exhibit 20, or at another location. Such detection may be performed by sensors such as video sensor 40 or infrared sensors 45.

Sensors 40 and 45 may also be used to determine a location according to which a message is stored. In the above-described example, the message is stored in association with an identifier representing locations proximate to exhibit 20. This particular identifier was stored because the first mobile device was in communication with interface device 25, which is associated with exhibit 20. Alternatively, the location information could be determined using sensors 40 and/or 45. In such a case, the determined location information may comprise geographic coordinates, predefined coordinates of a coordinate system specific to exhibit hall 10, an identifier representing the location of exhibit 20, or any other location information. Of course, any of interface devices 25 through 27 may include sensors capable of generating such location information.

In some embodiments, the first user simply approaches exhibit 20 and inputs a message into mobile device 30. The location of mobile device 30 is automatically determined using any of the above techniques and the message is stored in association with information representing the location, or in some other manner according to the location. Also in some embodiments, mobile device 31 is then detected proximate to the location and the message is "pushed" to mobile device 31. Each of these embodiments allows the message to be exchanged while requiring fewer actions from users.

As mentioned above, more specific features of the invention, additional embodiments, additional uses, and particular advantages thereof are set forth below.

Network Architecture

Figure 2:
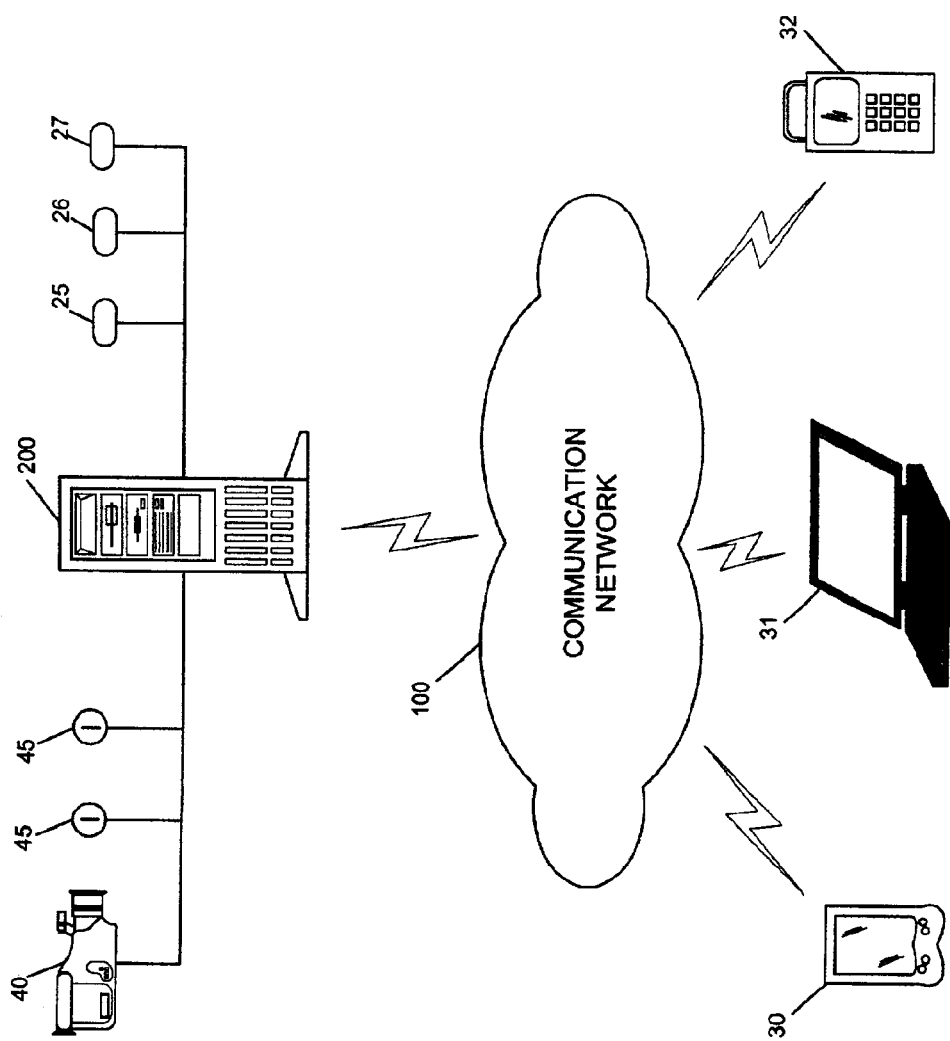
FIG. 2 is a topographic view of a network architecture according to embodiments of the present invention.

FIG. 2 is a topographic view of a network architecture according to some embodiments of the invention as shown in FIG. 1. Different network architectures may be used to implement the FIG. 1 system or other embodiments of the invention.

FIG. 2 shows communication network 100 in communication with message controller 200 and mobile devices 30 through 32. Communication network 100 may comprise any number of systems for transferring data, including a local area network, a wide area network, a telephone network, a cellular network, a fiber-optic network, a copper wire network, a satellite network, an infra-red network, a radio frequency network such as a Bluetooth® network, an I.E.E.E. 802.11 network, and a HomeRF network, and any other type of network which may be used to transmit information between devices. Additionally, communication network 100 may be used to transmit data using any known transmission protocol, such as Asynchronous Transfer Mode (ATM), Internet Protocol (IP), Hypertext Transfer Protocol (HTTP) and Wireless Application Protocol (WAP). In one embodiment, communication network 100 is the World Wide Web.

Message controller 200 may comprise a local area network server, Web server or other device capable of performing steps according to the present invention. According to some embodiments, message controller 200 operates to receive a message from a first mobile device operated by a user, store the message according to a location of the mobile device, receive an indication that a second mobile device operated by a second user is located proximate to the location, and transmit the message to the second mobile device. Message controller 200 may also control various operations of an entity providing messaging services, such as billing, accounting, sales tracking and the like.

In this regard, such an entity may charge fees to and receive payment from a user of the first mobile device in exchange for storing the message and/or charge fees to and receive payment from a user of the second mobile device in exchange for transmitting the message to the second mobile device. On the other hand, the entity may provide a benefit such as money, goods, services, coupons and entitlements to a user of the first mobile device in exchange for receiving a message therefrom. Details of one embodiment of message controller 200 are set forth below with respect to FIG. 3.

In communication with controller 200 are video sensor 40, infrared sensors 45 and interface devices 25 through 27. Controller 200 receives data from these devices to operate in accordance with embodiments of the present invention. In the embodiments described above, controller 200 receives location information from sensors 40 and 45 and/or from interface devices 25 through 27. Messages may also be received from and transmitted to mobile devices 30 through 32 via interface devices 25 through 27, although this communication is not illustrated in FIG. 2.

As described above, mobile devices 30 through 32 of FIG. 2 comprise a laptop computer, a PDA and a cellular telephone. Mobile devices 30 through 32 may be used to establish communication with controller 200 over network 100, to generate a message, to transmit the message to controller 200, to request a message from controller 200, and to receive a message from controller 200. Mobile devices 30 through 32 may also determine their respective locations and transmit information representing their locations to controller 200. This information may be stored in association with a transmitted message or may be used by controller 200 to determine a message to transmit. Of course, mobile devices 30 to 32 may also be used to provide a user with other functions, such as word processing, scheduling, e-mail, telephone communication, or the like.

It should be noted that the elements of FIG. 2 may be connected differently than as shown. For example, some or all of the elements may be connected directly to one another. Of course, embodiments of the invention may include elements that are different from those shown. Moreover, although the illustrated communication links between the components of FIG. 2 appear dedicated, it should be noted that each of the links may be shared by other components. Additionally, elements shown in communication with each other need not be constantly exchanging data. Rather, communication may be established when necessary and severed at other times or always available but rarely used to transmit data.

Message Controller

Figure 3:
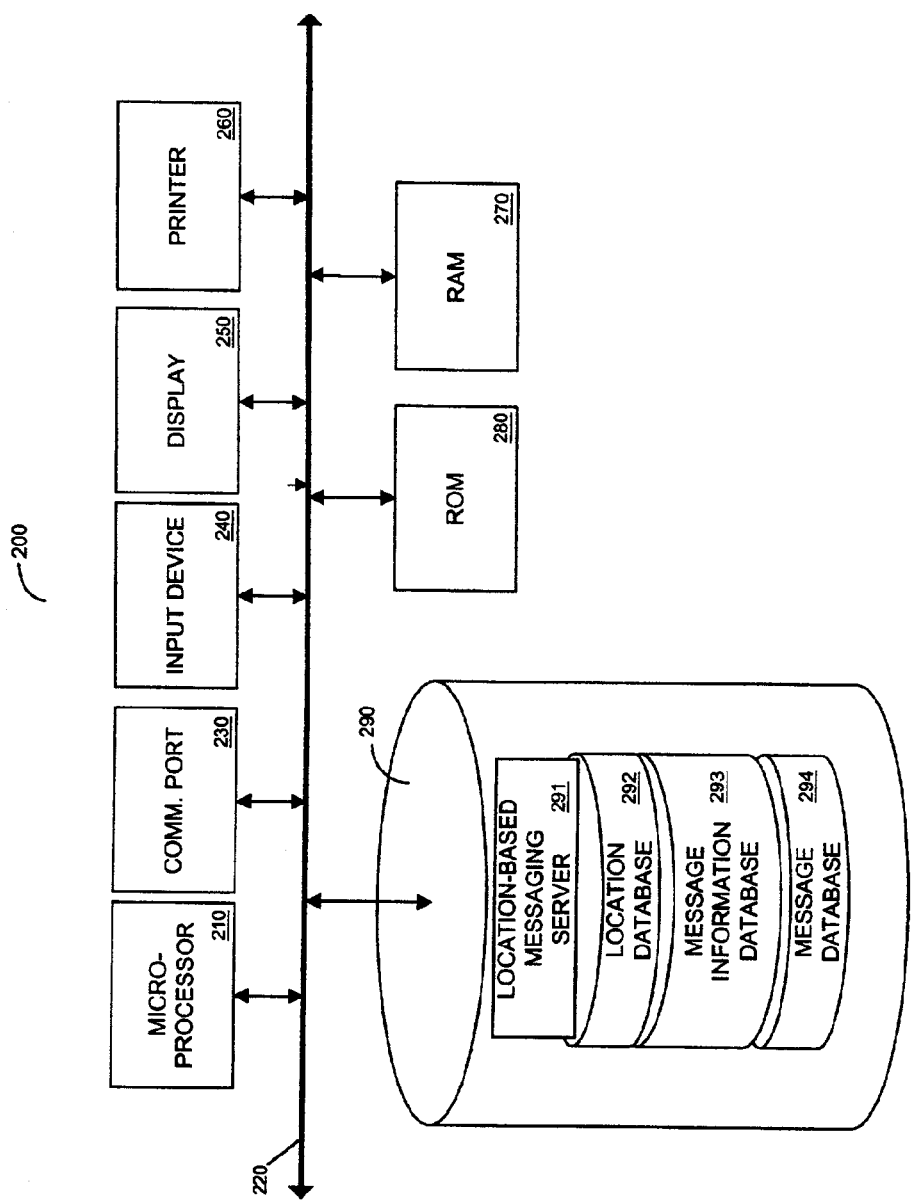
FIG. 3 is a block diagram of an internal architecture of a message controller according to embodiments to the present invention.

FIG. 3 is a block diagram of the internal architecture of message controller 200 according to one embodiment of the invention. As illustrated, message controller 200 includes microprocessor 210 in communication with communication bus 220. Microprocessor 210 may be a Pentium™, RISC™, or other type of processor and is used to execute processor-executable process steps so as to control the components of message controller 200 to provide functionality according to embodiments of the present invention.

Also in communication with communication bus 220 is communication port 230. Communication port 230 is used to transmit data to and to receive data from devices external to message controller 200. Communication port 230 is therefore preferably configured with hardware suitable to physically interface with desired external devices (such as sensors 40 and 45 and interface devices 25 through 27)

and/or network connections (such as to communication network 100). Accordingly, location information and messages may be received and transmitted over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an entity operating message controller 200 to input location information, user information, billing information, advertising information and other information to message controller 200. Of course, such information may also be input to message controller 200 via communication port 230. Commands for controlling operation of message controller 200 may also be input using input device 240. Display 250 may be an integral or separate CRT display, a flat-panel display or the like. Display 250 is generally used to output graphics and text to an operator in response to commands issued by microprocessor 210. Printer 260 may also output graphics and text, but in hardcopy form using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230. It should be noted that one or both of RAM 270 and ROM 280 may communicate directly with microprocessor 210 instead of over communication bus 220.

Data storage device 290 stores, among other data, processor-executable process steps of location-based messaging server 291. Microprocessor 210 executes process steps of location-based messaging server 291 in order to provide messaging services to mobile devices in accordance with embodiments of the present invention. For example, the process steps are executed to receive a message from a first mobile device operated by a user, store the message according to a location of the mobile device, receive an indication that a second mobile device operated by a second user is located proximate to the location, and transmit the message to the second mobile device.

The process steps of location-based messaging server 291 may be read from a computer-readable medium, such as a floppy disk, a CD-ROM, a DVD-ROM, a Zip™ disk, a magnetic tape, or a signal encoding the process steps, and then stored in data storage device 290 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Data storage device 290 also stores location database 292, message information database 293 and message database 294. Location database 292 includes information relating to locations at which messages may be transmitted and received according to the present invention. One example of location database 292 is described below with respect to FIG. 5.

Message information database 293 stores information relating to messages. This information may include location information associated with a message and message details such as an identity of a sender, preferred receivers, a time and date stored, and message topic. The information may also include a pointer to a file containing an actual message. A representative example of message information database 293 is shown in FIG. 6.

Message database 294 stores data comprising actual messages received and transmitted by message controller 200. The stored data may be accessed using pointers to the data that are stored in message information database 294. The data may include one or more of text, image, voice, audio, data, characteristics of a user from whom the data was received, a time, a date, biometric values associated with the user, and any other type of data.

Stored in data storage device 290 may also be other unshown elements that may be necessary for operation of message controller 200, such as other applications, other data files, a network server, an operating system, a database management system and "device drivers" for allowing microprocessor 210 to interface with devices in communication with communication port 230. These elements are known to those skilled in the art, and are therefore not described in detail herein.

Mobile Device

Figure 4:
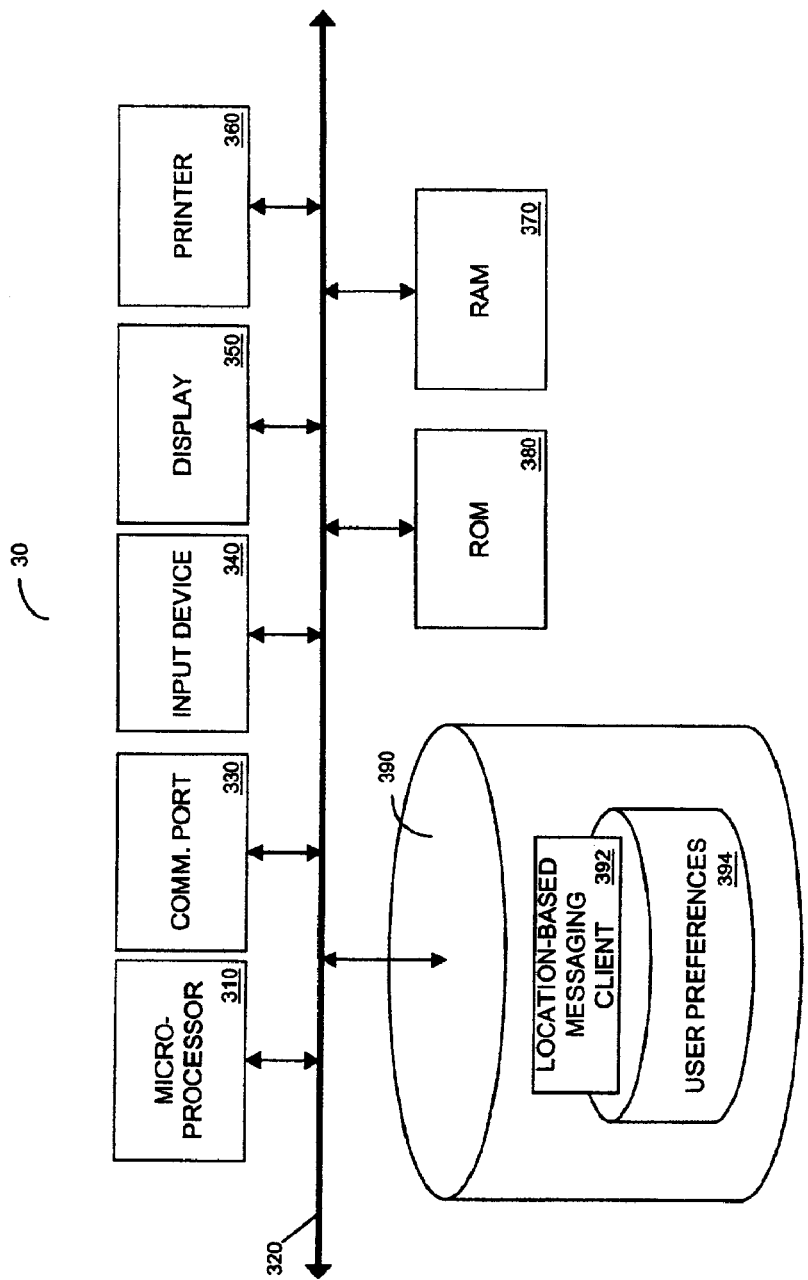
FIG. 4 is a block diagram of an internal architecture of a mobile user device according to embodiments to the present invention.

FIG. 4 illustrates several components of mobile device 30 according to embodiments of the invention. The components may comprise any of the specific examples set forth above with respect to identically-named components of message controller 200. Of course, specific functions performed by the components may differ from the functions performed by the identically-named components.

In this regard, communication port 330 may be used to transmit messages and location information directly or indirectly to message controller 200, and to receive messages therefrom. Input device 340 may be used to create messages, to issue commands to establish communication with controller 200, to issue commands to transmit messages, and to issue requests to receive messages. Messages may be output by display 350 or by printer 360. Input device 340, display 350 and printer 360 may also be used in conjunction with functionality provided by mobile device 30 that is unrelated to the present invention.

Data storage device 390 stores process steps of location-based messaging client 392, which is executed by microprocessor 310 to perform the steps herein attributed to mobile device 30. Also stored in data storage device 390 are user preferences 394. Preference information stored in user preferences 394 may be transmitted to controller 200 so as to enable controller 200 to operate in accordance with the desires of a user operating mobile device 30. For example, stored preference information may specify that the user wishes to receive a most-recent message associated with every location at which mobile device 30 is located. Accordingly, controller 200 detects mobile device 30 proximate to a location, receives the above-described preference information, retrieves a most-recent message associated with the location, and transmits the message to the user. User preferences 394 thereby provide customized functionality to the user.

Data storage device 390 may also store application files, data files and system files other than those shown in FIG. 4. These files may be used by mobile device 30 to provide various functionalities to a consumer in addition to those provided by the present invention. It should also be noted that mobile device 300 might not include process steps 392 or preferences 394. For example, device 300 may comprise a cellular phone which receives messages from controller 200 and/or one or more of interface devices 25 through 27.

Location Database

A tabular representation of a portion of location database 292 is shown in FIG. 5. The information stored in location database 292 may be entered by an operator of message controller 200 through input device 240 or may be received from another device over communication network 100. The stored information includes location information representing a location.

Specifically, location database 292 includes several records and associated fields. The fields include location ID field 501, description field 502, and location field 503. Location ID field 501 of a record represents a location that is the subject of the record. Description field 502 provides a description of a location and/or of a physical entity. Physical entities that may be described in description field 502 include at least a vending machine, a display, and an advertisement, while described locations may include at least an exhibit, a retail store, a restaurant and an entertainment venue.

Location field 503 may specify a location according to the present invention. A location may be specified by any current or future data types used for specifying a location, including latitude and longitude, postal address, Global Positioning System coordinates, Bluetooth® proximity data, I.E.E.E. proximity data, and transmission tower location data. As shown in FIG. 5, some records of location database 292 specify "Unknown" in location field 503. Such a record is considered to represent a current location of the physical entity described in associated description field 502.

Of course, location database 292 may include information in addition to or instead of that shown in FIG. 5. For example, location database 292 may include information identifying interface devices and sensors located proximate to the locations represented therein, special instructions for receiving and transmitting messages from and to mobile devices located at the locations, and other location-specific information.

Furthermore, if controller 200 controls dedicated devices used to store messages associated with particular locations, information representing multiple locations such as that stored in location database 292 need not be stored. In this regard, all messages stored in each dedicated device are assumed to be associated with the particular location associated with the device.

Message Information Database

A tabular representation of a portion of message information database 293 is shown in FIG. 6. Message information database 293 includes information that may be used to determine a message to transmit to a mobile device located at a given location. The information may be input by an operator of message controller 200 or by another device in communication therewith. Several uses of the information stored in message information database 293 are set forth below.

Each record of message information database 293 includes message ID field 601, location ID field 602, message details field 603, and message file field 604. Message ID field 601 of a record includes an identifier specifying a message that is the subject of the record. The identifier may be assigned by message controller 200 when information relating to the message is stored in message information database 293.

Location ID field 602 of a record of database 293 specifies a record of location database 292. In some embodiments, the message associated with the record of database 293 was received from a mobile device located at the location represented by the information stored in the record of location database 292. Similarly, location database 292 may be used to identify a location ID based on a received location of a second mobile device, and the location ID may be used to identify a message of message information database 293 for transmitting to the second mobile device.

Message details field 603 stores information related to a stored message. The information may be used to determine whether or not to transmit the message to a mobile device. Examples of information stored in message details field 603 include a message storage date, a message storage time, a message type, a required receiving fee, required demographics of a receiving user such as age, gender, and income, message language, message rating, and data comprising the message itself.

Stored in message file field 604 is a path to a data file embodying a message stored in message database 294. Message file field 604 may specify "None" if associated message details field 603 includes data embodying a message.

Message information database 293 may also include message-related information other than that described above, such as characteristics of a user of the mobile device from which the message was received. Such characteristics may be received from user preferences 394 of mobile device 300 or from another device.

It is contemplated that each of location database 292 and message information database 293 may include many more records than those shown and that each record may include associated fields other than those illustrated. It should also be noted that the tabular illustrations and accompanying descriptions of the databases merely represent relationships between stored information. A number of other arrangements may be employed besides those suggested.

Specific Example

Figure 7:
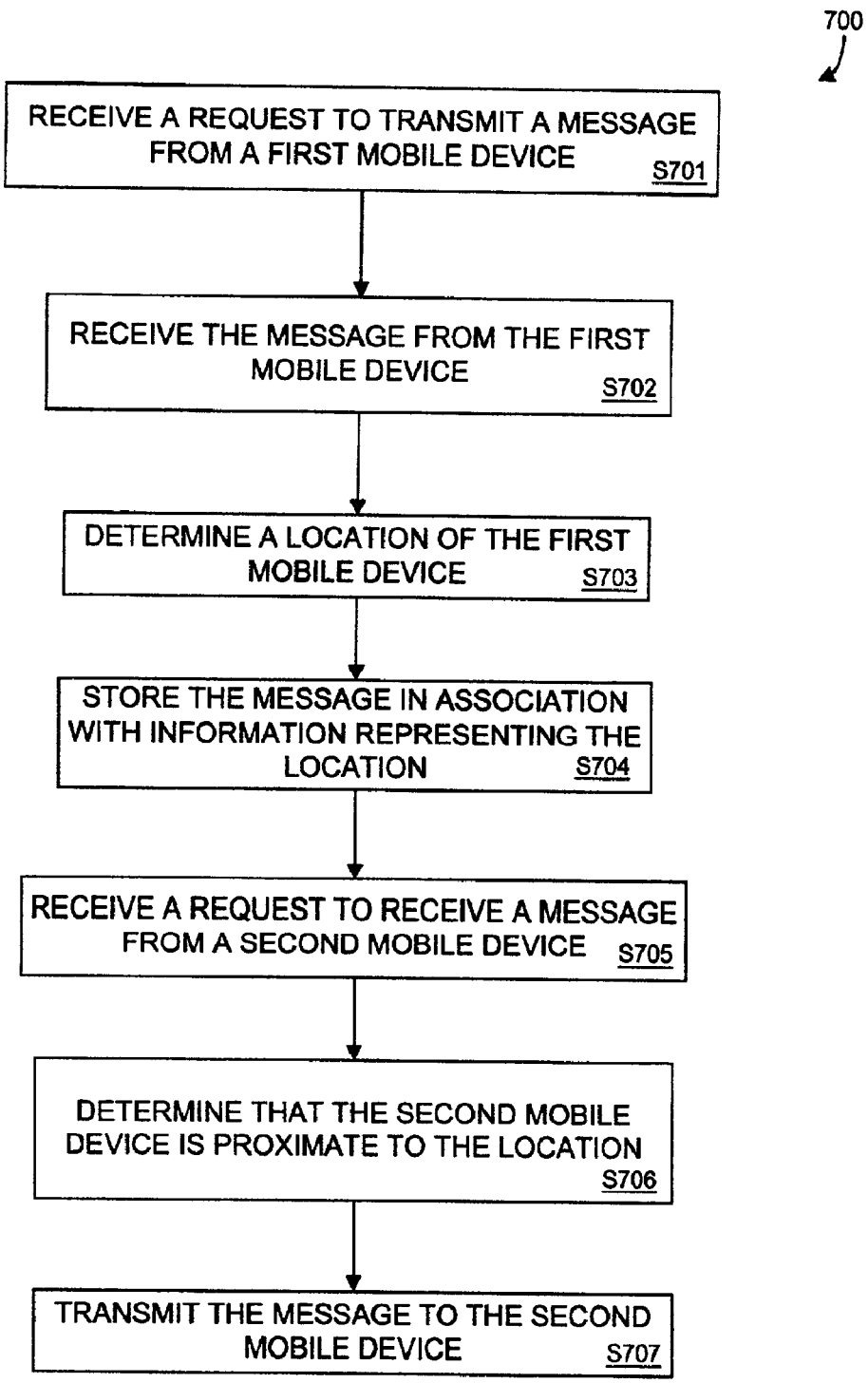
FIG. 7 is a flow diagram of process steps to facilitate electronic shopping according to embodiments of the present invention.

Process steps 700 of FIG. 7 set forth a process to transfer data according to some embodiments of the present invention. Process steps 700 are described below as if included in location-based messaging server 291 and executed by microprocessor 210 of message controller 200. Of course, it should be noted that process steps 700 may be performed by any device or by any number of devices in combination, including mobile device 30. Moreover, some or all of process steps 700 may be performed manually.

Process steps 700 begin at step S701, in which a request to transmit a message is received from a first mobile device. In some embodiments, the request may simply comprise a signal indicating that the first mobile device is at a particular location. Such a signal may be transmitted by a sensor detecting the first mobile device at the location, or may be broadcast by the first mobile device. It should be noted that if such a signal is received prior to step S701, controller 200 may, in response, transmit an invitation to transmit a message or a question may be transmitted to the first mobile device. It should be noted that the request received in step S701 may simply comprise a communication used to establish a communication link with message controller 200. Also in some embodiments, the request may be transmitted from the first mobile device to controller 200 directly over communication network 100 or via an interface such as interface devices 25 through 27.

After step S701 but prior to step S702, controller 200 may transmit a communication to the first mobile device indicating that the first mobile device may proceed to transmit the message. Upon receiving such a communication, a user of the first mobile device operates the device so as to generate a message (if not previously generated) and to transmit the message to message controller 200. In some embodiments, the communication requires the user to provide a payment to controller 200 before controller 200 will store the message. Whether or not a payment is required and an amount of the payment may be determined based on the user, the location of the mobile device, characteristics of the message including message size and message type, restrictions the user wishes to place on receipt of the message, or any other factors. Of course, controller 200 might not transmit any communication to the first mobile device prior to step S702. In this regard, some embodiments of the claimed invention do not include reception of a request as described with respect to step S701.

Regardless of the foregoing, a message is received in step S702, and a location of the first mobile device is determined in step S703. The location may be transmitted to message controller 200 by a sensor, interface device or other device in communication therewith, and may also be received from the first mobile device. For example, the first mobile device may directly or indirectly transmit a code located at the location to controller 200, thereby indicating the location. It should be noted that the first mobile device, sensors or interface devices may transmit any type of data used to specify a location to controller 200. In some embodiments, the data is analyzed so as to identify a corresponding record in location database 292. For example, controller 200 may store a database for converting received location data to location identifiers stored in location ID field 501 of location database 292. In some embodiments, controller 200 is dedicated to a specific location. Accordingly, a location may be determined in step S703 simply by virtue of receipt of the message by controller 200.

After the location is determined, the received message is stored in association with information representing the determined location in step S704. According to one example of step S704, the message is stored as a file in message database 294, a path to the file is stored in message file field 604 of a record of message information database 293, and an identifier associated with the location is stored in location ID field 602 of the record. The message is thereby stored in association with information representing the determined location. Many other techniques may be used to store the message in association with information representing the determined location.

A request to receive a message is received from a second mobile device in step S705. As mentioned with respect to step S701, the request may be transmitted to controller 200 directly or via one of interface devices 25 through 27, or may simply comprise a signal indicating that the second mobile device is proximate to the location determined in step S703. The signal may be output by a sensor or may be broadcast by the second mobile device.

The request may comprise a request for information concerning the location or concerning a physical entity proximate to the location. The request may further comprise a request for a message stored by a user, a request for a first message stored by a user, a request for a last message stored by a user, a request for all messages stored by a user, and a request for all messages stored by all users. Generally, the request may comprise a request for one or more messages that satisfy a given condition.

In step S706, it is determined that the second mobile device is proximate to the location determined in step S703. Such a determination may be made in any manner, including by receiving a signal from sensors 40 or 45, by receiving an indication of the location from the second mobile device, and by identifying an interface device through which the request of step S705 was received. In a particular embodiment, the second mobile device scans a barcode located at the location or on a physical entity proximate to the location and transmits the scanned barcode data directly or indirectly to controller 200. Controller 200 then determines the location in step S706 using a database that associates locations with barcode data. Of course, step S706 may be passed over in a case that step S705 comprises reception of a signal indicating that the second mobile device is proximate to the location.

In some embodiments, step S706 is performed prior to step S705. More specifically, it is determined that the second mobile device is proximate to the location and an offer to transmit the message is transmitted to the second mobile device. In response to the offer, a request to receive the message is received from the second mobile device.

Returning to process steps 700, the message is transmitted to the second mobile device in step S707. For example, if it is determined in step S706 that the second mobile device is proximate to the location identified by location identifier "L94" in location database 292, message file "P349.jpg" is identified using message information database 293, the message file is retrieved from message database 294, and the message is transmitted to the second mobile device. It should be noted that the message may be transmitted in step S707 using a communication protocol different from the communication protocol used to receive the message in step S702.

In some embodiments of step S707, it is necessary to first determine what, if any, message to transmit to the second mobile device. Using the above example, message details field 603 of the subject record specifies "receiving age >17". Accordingly, although the second device was determined to be located proximate to location "L94", the associated message cannot be transmitted unless it is determined that a user receiving the message is greater than 17 years old. Other criteria may also be used to determine whether to transmit the message to the second mobile device, including a policy of a user of the first mobile device, a policy of a venue including the location, a group affiliation, a policy of a user of the second mobile device, an age of the message, a language of the message, and a payment made by the user of the second mobile device. User preferences stored in the second mobile device or a user profile stored in controller 200 may be used to determine whether any of the foregoing criteria are met.

In some embodiments, the message transmitted to the second mobile device comprises an aggregation of received messages. For example, the message received in step S702 may include a rating from a user of the first mobile device. This rating may be aggregated with ratings received from other users to produce the message transmitted in step S707. Also included in the transmitted message may be an advertisement, product specification, product offer and/or a time of day provided by a third party and perhaps related to the location.

The message may comprise a question posed to the user of the second mobile device. For example, a user of a first mobile device may create and transmit a question to be stored in association with location information representing an advertising display. Accordingly, the message may be transmitted in step S707 if it is determined in step S706 that the second mobile device is located proximate to the advertising display. The second mobile device may then transmit a response to the message that is sent to a third party such as the advertiser or to controller 200. These embodiments may therefore be used to provide polling, market research or survey services.

The message may be transmitted in step S707 in a format different from the format in which it was received in step S702. For example, the message may have been received as an audio file in step S702 and may be transmitted as a text file in step S707. The message may therefore be converted from the audio file to the text file by any method between steps S702 and S707.

In some embodiments, the second mobile device transmits a rating of the message to controller 200 after step S707. The rating is stored in association with the message and may be used to determine whether to transmit the message to a third mobile device. The rating may also be transmitted to the third mobile device along with the message.

According to some embodiments, the message is stored proximate to the location of the first mobile device. Specifically, the message may be stored or transmitted by objects such as a kiosk, a picture frame, an automated teller machine, a building, a server, a pedestal, and a telephone booth. Moreover, a benefit may be provided to a user of the first mobile device in exchange for transmission of a message to controller 200. The benefit may include money, goods, services, coupons and entitlements.

As a result of the foregoing features, efficient communication is provided between two mobile devices without requiring information identifying the receiving device or direct communication between the devices. Of course, some embodiments may require such features. Moreover, although the present invention has been described with respect to particular embodiments thereof, those skilled in the art will note that various substitutions may be made to those embodiments described herein without departing from the spirit and scope of the present invention.

What is claimed is:

1. A method of transferring data, comprising:
   receiving a message from a first mobile device operated by a user;
   storing the message according to a location of the first mobile device;
   receiving a payment from the user of the first mobile device in exchange for storing the message;
   receiving an indication that a second mobile device operated by a second user is located proximate to the location; and
   transmitting the message to the second mobile device.

2. A method according to claim 1, wherein the message is received using a first communication protocol and is transmitted using a second communication protocol.

3. A method according to claim 1, where the message is received in a first format and is transmitted in a second format.

4. A method according to claim 1, wherein the storing step comprises:
   storing the message in association with location information representing the location of the first mobile device.

5. A method according to claim 4, wherein the location information represents a location of a physical entity.

6. A method according to claim 5, wherein the physical entity is at least one of a vending machine, an exhibit, a retail store, a display, a restaurant, an advertisement, and an entertainment venue.

7. A method according to claim 1, further comprising:
   determining the location of at least one of the first mobile device and/or a location of the second mobile device.

8. A method according to claim 7, wherein the location of the first mobile device and/or the location of the second mobile device are determined in the form of at least one of: geographic coordinates, a street address, Global Positioning System coordinates; Bluetooth proximity data; I.E.E.E. 802.11 proximity data; transmission tower location data; and scanned barcode data.

9. A method according to claim 1, further comprising:
   receiving a request for information from the second mobile device.

10. A method according to claim 9, wherein the request comprises a request for a message stored by a user.

11. A method according to claim 9, wherein the request comprises a request for a first message stored by a user.

12. A method according to claim 9, wherein the request comprises a request for a last message stored by a user.

13. A method according to claim 9, wherein the request comprises a request for all messages stored by a user.

14. A method according to claim 9, wherein the request comprises a request for all messages stored by all users.

15. A method according to claim 9, wherein the request comprises a request for all messages that satisfy a given condition.

16. A method according to claim 15, wherein the request comprises a request for all messages stored by users who satisfy the given condition.

17. A method according to claim 1, wherein the message comprises at least one of: text; image; video; voice; audio; data; characteristics of a user of the first mobile device; data associated with a user of the first mobile device; time; date; and biometric values associated with the user.

18. A method according to claim 1, wherein the message is received via a communication form comprising at least one of: Bluetooth; cellular; I.E.E.E. 802.11; HomeRF; copper wire; infrared, and fiber optics.

19. A method according to claim 1, wherein the message is stored proximate to the location of the first mobile device.

20. A method according to claim 1, wherein the message comprises a question.

21. A method according to claim 1, further comprising:
   receiving a response to the message from the second mobile device.

22. A method according to claim 21, further comprising:
   transmitting the response to a third party.

23. A method according to claim 22, further comprising:
   receiving a payment from the third party in exchange for the response.

24. A method comprising:
   receiving a message from a first mobile device operated by a user;
   storing the message according to a location of the mobile device;
   receiving an indication that a second mobile device operated by a second user is located proximate to the location;
   determining whether to transmit the message to the second mobile device based on at least one of: a policy of a user of the first mobile device; a policy of a venue including the location; a group affiliation; a policy of a user of the second mobile device; a characteristic of a user of the second mobile device; an age of the message; a language of the message; or a payment made on behalf of the user of the second mobile device; and
   transmitting the message to the second mobile device.

25. A method according to claim 24, wherein the determining step is performed by a third party.

26. A method according to claim 1, further comprising:
   receiving a rating of the message from the second mobile device.

27. A method according to claim 26, further comprising:
   transmitting the rating to a third mobile device.

28. A method according to claim 1, wherein the message transmitted to the second mobile device comprises an aggregation of received messages.

29. A method according to claim 1, wherein the message transmitted further comprises at least one of the advertisement, a product specification, a product offer, and a time of day.

30. A method according to claim 29, wherein the at least one of an advertisement, a product specification, and a product offer are provided by a third party.

31. A method comprising:
   receiving a message from a first mobile device operated by a user;
   storing the message according to a location of the first mobile device;
   receiving an indication that a second mobile device operated by a second user is located proximate to the location;
   transmitting the message to the second mobile device; and
   receiving a payment from the second user of the mobile device in exchange for transmitting the message to the second mobile device.

32. A method according to claim 1, wherein the message relates to at least one of: entertainment; music; a movie; information; education; a product and an advertisement.

33. A method according to claim 1, wherein the message is stored and transmitted by at least one of: a kiosk; a picture frame; an automated teller machine; a building; a server; a pedestal; a telephone; and a telephone booth.

34. A method according to claim 1, further comprising:
   transmitting a first message to the first mobile device before receiving the message from the first mobile device.

35. A method according to claim 34, wherein the first message is a question, and wherein the message is a response to the question.

36. A method according to claim 1, further comprising:
   providing a benefit to a user of the first mobile device in exchange for the message.

37. A method according to claim 36, wherein the benefit is at least one of: money; goods; services; coupons; and entitlements.

38. A method according to claim 1, further comprising:
   detecting the first mobile device; and
   transmitting a request for the message to the first mobile device.

39. A method according to claim 1, further comprising:
   detecting the second mobile device; and
   transmitting an offer of a message to the second mobile device.

40. A medium storing processor-executable process steps to transfer data, the process steps comprising:
   a step to receive a message from a first mobile device operated by a user;
   a step to store the message according to a location of the first mobile device;
   a step to receive an indication that a second mobile device operated by a second user is located proximate to the location;
   a step to transmit the message to the second mobile device, and
   a step to receive a payment from the second user of the second mobile device in exchange for transmission of the message to the second mobile device.

41. An apparatus comprising:
   a processor; and
   a storage device in communication with the processor and storing instructions adapted to be executed by the processor to:
   receive a message from a first mobile device operated by a user;
   store the message according to a location of the first mobile device;
   receive an indication that a second mobile device operated by a second user is located proximate to the location;
   transmit the message to the second mobile device; and
   receiving a payment from the second user of the second mobile device in exchange for transmission of the message to the second mobile device.

42. A medium storing processor-executable process steps to transfer data, the process steps comprising;
   a step to receiving a message from a first mobile device operated by a user;
   a step to store the message according to a location of the first mobile device;
   a step to receive a payment from the user of the first mobile device in exchange for storage of the message;
   a step to receive an indication that a second mobile device operated by a second user is located proximate to the location; and
   a step to transmit the message to the second mobile device.

43. An apparatus comprising:
   a processor; and
   a storage device in communication with the processor and storing instructions adapted to be executed by the processor to:
   receive a message from a first mobile device operated by a user;
   store the message according to a location of the first mobile device;
   receiving a payment from the user of the first mobile device in exchange for storage of the massage;
   receiving an indication that a second mobile device operated by a second user is located proximate to the location; and
   transmit the message to the second mobile device.

* * * * *